Patented Oct. 10, 1939

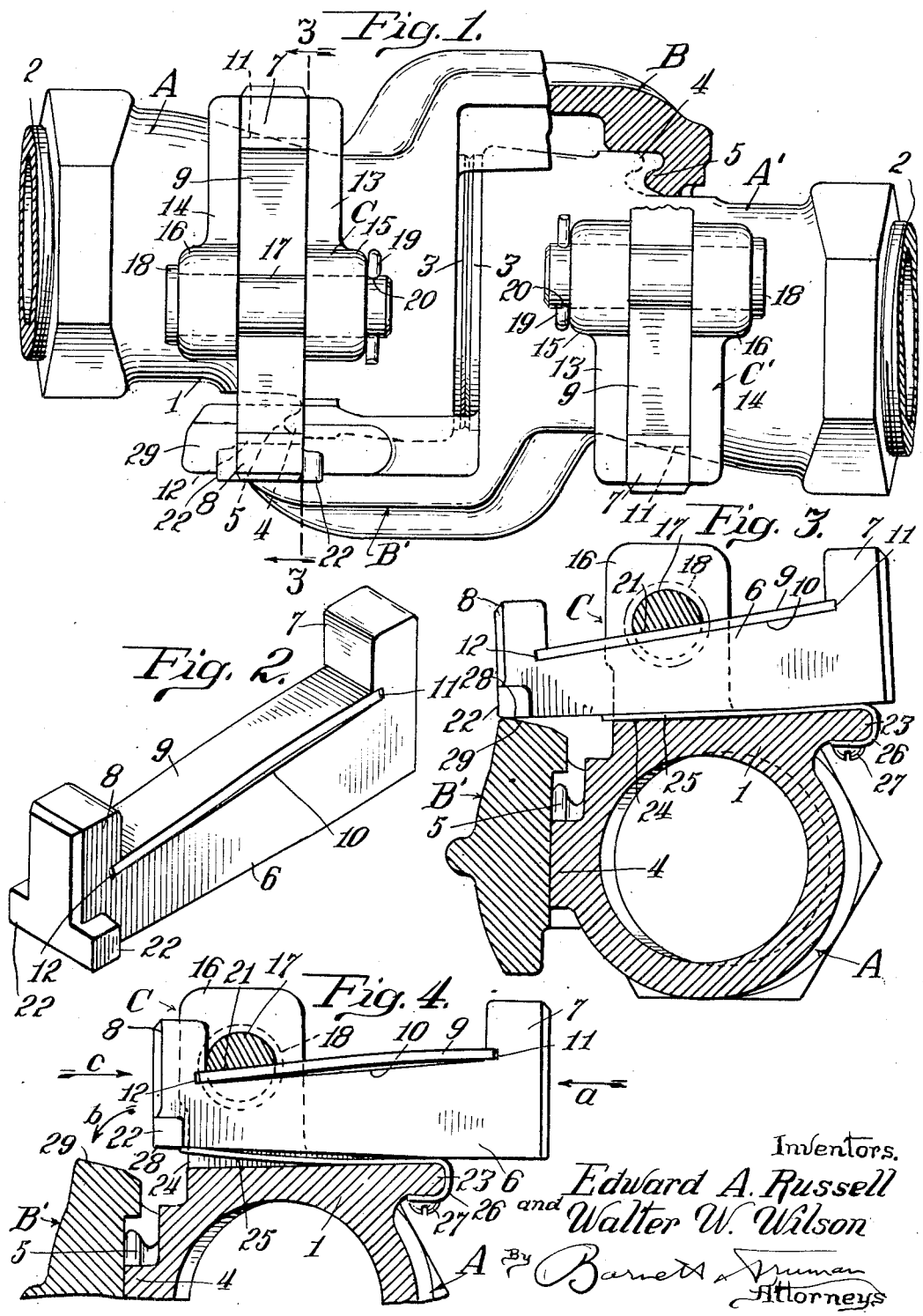

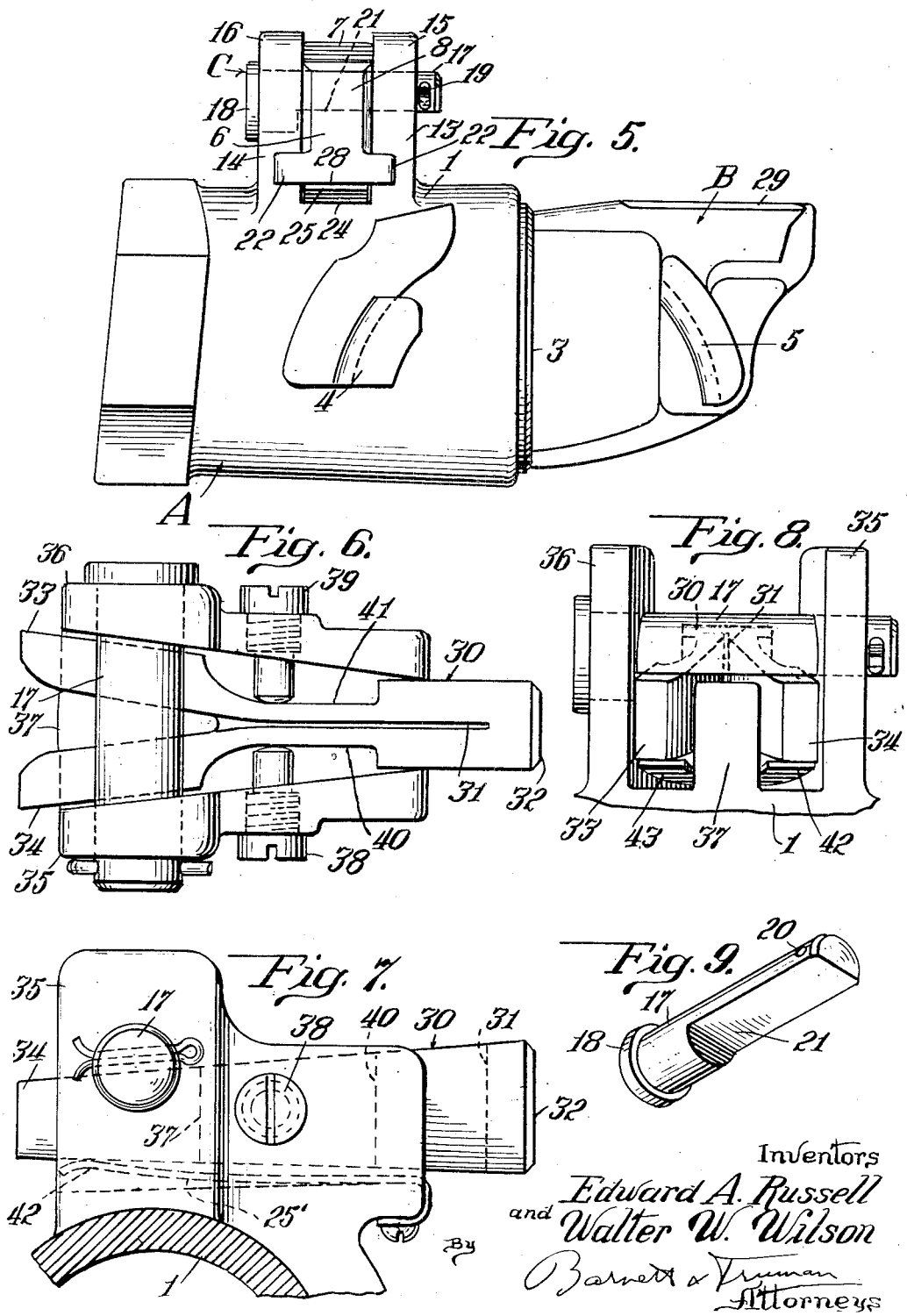

2,175,764

UNITED STATES PATENT OFFICE 2,175,764

HOSE COUPLER LOCK

Edward A. Russell, Chicago, and Walter W. Wilson, Oak Park, Ill., assignors to Vapor Car Heating Company, Inc., Chicago, Ill., a corporation of New York Application June 13, 1938, Serial No. 213,350

11 Claims. (Cl. 285—68)

This invention relates to hose couplers for connecting together the hoses or other flexible end sections of the train pipes of adjacent railway cars, and more particularly to a new and improved locking means for holding a pair of such mating couplers securely in engagement.

Hose couplers of the type to which this invention is particularly applicable each comprise a head member having an open end adapted to be clamped against and in communication with the similar open end of a mating coupler, the head having a forwardly projecting arm at one side thereof provided with a cam member adapted to be swung into engagement with a mating cam member on the side of the head of the mating coupler. Various forms of locking devices have heretofore been provided on the heads of the couplers adapted to be moved into engagement with the projecting arm of the mating coupler so as to prevent disengagement of the cam members. Such locking devices have included a sliding bar or wedge which is movable lengthwise of itself and transversely of the head on which it is mounted so that the inner end of the bar or wedge will move over and lock against the upper surface of the projecting arm. There are several objections to this form of locking device as heretofore known. The projecting arms do not always stand at uniform heights with respect to the mating coupler head, and consequently the upper surface of the arm is not always in proper position to be frictionally engaged by the laterally driven wedge or bar. Furthermore, when the locking bar or wedge is driven laterally into frictional locking engagement with the upper surface of the arm, the arm is frequently distorted by the lateral pressure exerted on the arm by the transverse movement of the locking member. Also the excessive frictional engagement between the locking member and arm as the locking member is driven to position causes excessive wear of the engaging parts.

According to the present invention, a lengthwise movable locking wedge is so mounted on the head that the inner arm-engaging end of the arm will be swung downwardly as it is driven inwardly. In this way the locking bar or wedge is first moved partially into position above the arm without contacting therewith before the downward swinging movement brings the bar into engagement with the arm. The force then and subsequently exerted against the arm is for the most part in a downward direction, thereby effecting a firm locking engagement of the parts without excessive sliding frictional engagement between the bar and arm, and with a minimum outward or spreading thrust against the arm member which might tend to distort the arm.

Briefly described, the locking wedge is guided on the head between lateral guide members and between upper and lower slide surfaces which engage the wedge surfaces of the bar, one near the upper inner end of the wedge and the other nearer to the outer lower end of the wedge. As a consequence, when the wedge is driven inwardly and an increasingly thicker portion of the wedge is interposed between these slide surfaces, the inner end of the wedge will be tilted or swung downwardly. A spring interposed between the head and the inner portion of the wedge normally urges the wedge upwardly as far as will be permitted by the respective upper and lower slide or fulcrum surfaces.

The principal object of this invention is to provide an improved locking device for a hose coupler, as briefly described hereinabove and disclosed more in detail in the specifications which follow.

Another object is to provide an improved locking wedge so mounted as to have a combined lengthwise and vertical swinging movement.

Another object is to provide a locking wedge of the type hereinabove described with an upper spring surface adapted to hold the wedge frictionally against accidental displacement when in locked position.

Other objects and advantages of this invention will be more apparent from the following detail description of certain approved hose-coupler locking devices constructed and operating according to the principles of this invention.

In the accompanying drawings:

Fig. 1 is a plan view of a train pipe coupling comprising a pair of similar couplers in locked engagement with one another.

Fig. 2 is a perspective view of the locking wedge, with the upper spring in position thereon.

Fig. 3 is a transverse vertical section, taken substantially on the line 3—3 of Fig. 1.

Fig. 4 is a view similar to Fig. 3 but showing the locking member in withdrawn or unlocked position.

Fig. 5 is a side elevation of one of the coupler heads, with the locking device shown in end elevation.

Fig. 6 is a plan view of a modified form of locking device embodying a split wedge.

Fig. 7 is a side elevation of the locking device shown in Fig. 6.

Fig. 8 is an end elevation of the locking device shown in Figs. 6 and 7.

Fig. 9 is a perspective view of the fulcrum pin or bridging member.

The locked assembly shown in Fig. 1 comprises a pair of similar couplers A and A', each provided with similar forwardly projecting side arms B and B', and each carrying similar locking devices C and C'. It will be understood that the locking device C of coupler A engages with the projecting arm B' of coupler A', whereas the locking device C' of coupler A' engages the arm B of coupler A. Since the two coupler assemblies are identical, a description of one will suffice for both. It will furthermore be understood that these couplers are of a standard type (except for the improved locking device C) and will ordinarily be engageable with any other coupler now in use even though said mating coupler is provided with a different form of locking means.

Each coupler comprises a head or main body 1 into the rear end of which is connected the flexible hose 2 or equivalent flexible metallic structure extending from the train pipe on the railway car. The other end of head 1 is open and provided with a gasket device, partially indicated at 3, adapted to engage against the similar gasket on the mating coupler and thus provide a continuous conduit through the connected couplers. An arcuate cam 4 is provided on one side of head 1 adapted to be engaged by a similar arcuate cam 5 provided in the inner outer end of the projecting arm of the mating coupler. It will be understood that the couplers are first brought together, each in an upwardly tilted position, and then the couplers are simultaneously swung downwardly so as to bring the cams 5 simultaneously into engagement with the cams 4 and forcibly clamp the gaskets 3 together. With the parts in this assembled position, the locking device C of one coupler is adapted to engage over the arm B of the mating coupler and thus lock the assembled couplers against disengagement.

The improved locking device C comprises a locking bar 6 provided with enlarged driving heads 7 and 8 at its respective outer and inner ends, the bar being wedge-shaped in longitudinal vertical section between the heads 7 and 8. In the preferred form here shown, the lower surface of the wedge is substantially flat or horizontal, while the upper surface slopes upwardly from the thinner inner end toward the thicker outer end. Preferably a rather stiff leaf spring 9, normally upwardly bowed between its ends, is superposed on the upper sloping wedge surface 10 of bar 6, the ends of spring 9 being held slidably in notches or recesses 11 and 12 formed in the respective heads 7 and 8. When the wedge bar 6 is in locking position, the spring 9 will be flattened down as shown in Fig. 3 so as to conform substantially with the upper wedge surface 10, and this spring 9 could be omitted entirely, although it is preferably used and its particular function will be brought out hereinafter.

A pair of upwardly projecting substantially parallel guide flanges 13 and 14 are provided on the upper surface of head 1, and the wedge bar 6 is guided for lengthwise movement transversely of the head between these flanges 13 and 14. The inner ends of the guide flanges 13 and 14 are extended upwardly as indicated at 15 and 16 to support a transverse bridging member 17 which is engaged by the upper wedge surface 10 of bar 6, or more properly the upper surface of the interposed spring 9. In the preferred form here shown, the bridging member 17 is in the form of a bolt or pin rotatably mounted in the upwardly projecting ears 15 and 16, the pin having a head 18 on one end and held in place by a cotter pin 19 inserted through a hole 20 in the other end portion of the pin. The lower central portion of pin 17 is preferably flattened or cut away as indicated at 21 so as to provide an extended slide surface to be engaged by spring 9 or the upper surface of the wedge 6.

It will be understood that lengthwise movement of the locking bar or wedge 6 in either direction is limited by engagement of the upwardly extending portions of heads 7 and 8 with pin 17, or by engagement of the laterally projecting ears 22 at the lower inner end of the wedge with the end surfaces of guide flanges 13 and 14.

The upper surface of head 1, between the guide flanges 13 and 14, has a higher outer portion 23 for supporting the under surface of the wedge bar 6, and then slopes inwardly or is cut away so as to provide a recess 24 beneath the inner end portion of bar 6 to permit the bar to swing downwardly or pivot substantially about the supporting surface 23 of the head. A spring 25 is mounted in recess 24 for urging the bar upwardly into engagement with the bridging member or pin 17. In the form here shown spring 25 is a leaf spring having its outer end 26 bent around the supporting extension 23 of the head and secured in place by screw 27. When this form of spring is used the lower surface of wedge 6 will slide on the outer end portion of spring 25, above head extension 23, although if a different form of spring were used the wedge bar might slide directly on head portion 23.

When the locking bar or wedge is in withdrawn or unlocked position as shown in Fig. 4, it will be noted that the lower surface of the wedge is substantially horizontal, the inner end of the wedge being held against pin 17 by spring 25. When in this position the arm-engaging surface 28 at the lower inner end of the wedge is considerably above the locking surface 29 on the top of the mating arm B, and also the inner head 8 of the locking bar is withdrawn out of the way of the arm B so that it may be swung down to bring the cams 4 and 5 into locking engagement. The locking member is now applied by driving in the outer head 7 of the wedge bar as indicated by the arrow a, Fig. 4.

It will be noted that the wedge-engaging surface 21 of pin 17 is positioned near the inner thinner end of the wedge, whereas the lower surface of the wedge is supported at a position spaced nearer the outer thicker end of the wedge. Consequently, as the locking bar is driven inwardly and an increasingly thicker portion of the wedge member is interposed between the slide surfaces 21 and 23, the wedge bar will be tilted downwardly at its inner end or caused to pivot substantially about the outer lower supporting surface 23, so that the inner end of the wedge member will swing inwardly and downwardly as indicated by the arrow b in Fig. 4. Of course this will result in a compression of the spring 25, and the upper spring 9 will also be flattened down against the upper wedge surface, all as indicated in Fig. 3 as the locking bar is driven into engagement with the arm of the mating coupler.

It will now be seen that the movement of the inner locking end portion 28 of bar 6 will be mostly in a downward direction as it engages the arm B so that the outward force tending to spread or distort the arm B will be minimized as will also the frictional sliding movement between the engaging surfaces 28 and 29. This also minimizes the wear on these engaging surfaces.

The device may be unlocked in an obvious manner by driving outwardly the inner head 8 in the direction indicated by the arrow c in Fig. 4. The function of the upper flat spring 9 is to prevent accidental unlocking of the device by jarring of the parts, or by an accidental blow applied to head 8. If spring 9 were not used, there would be more possibility of the locking wedge working loose after having been driven to locking position. However, it will be noted that the normally upwardly bowed central portion of spring 9 will be positioned under pin 17 when the bar is in locking position as shown in Fig. 3, and consequently the tendency of this relatively stiff spring to expand or assume its normal bowed position will take up any slack in the parts and frictionally hold the device in locked position. Spring 9 is much stronger than the lower spring 25, but when the device is in the withdrawn or unlocked position shown in Fig. 4 the substantially flat end portion of spring 9 is under the pin 17 so that the lower spring 25 is free to hold the inner portion of the wedge in its elevated position.

While the wedge portion of the locking bar is preferably formed as in the example here shown, that is with a substantially horizontal lower surface and with an upwardly and outwardly sloping upper surface, it will now be apparent that by suitably positioning and designing the engaging surfaces 17 and 23, the wedge could be formed with a horizontal upper surface and a downwardly and outwardly sloping lower surface, or both surfaces of the wedge could be sloped so as to diverse outwardly. It is only necessary that an increasingly thicker portion of the wedge be interposed between the slide surfaces 21 and 23 so that the inner end of the wedge will be caused to swing downwardly. However, the design here shown is preferred.

In the modification shown in Figs. 6, 7 and 8, this same inventive idea is applied to a split-wedge type of locking bar. The locking bar 30 is centrally and vertically split at 31 from a point spaced somewhat from its outer end 32 so as to provide a forked inner arm-engaging end portion consisting of the two similar arms 33 and 34. The locking bar 30 is guided between the diverging upwardly extending guide flanges 35 and 36 on the head, and a central inner upwardly projecting wedge-shaped post 37 projects between the forks 33 and 34 of the bar so that these forked ends will be spread apart as the bar is driven inwardly. Holding screws 38 and 39 mounted in guide flanges 35 and 36 extend into elongated recesses 40 and 41 in the sides of locking bar 30. These screws engage the ends of these recesses to limit the longitudinal movement of the bar, and the forks of the bar are made more flexible by cutting away the metal at the sides as indicated at 40 and 41. It will be noted that the forks of the locking bar are wedged between the screws 38 and 39 and the central wedge post 37 as the bar is driven to locking position, thus tending to frictionally hold the bar in this locked position, in much the same manner as the locking bar is held in place by the upper spring 9 in the first described form of the invention.

Locking bar 30 is made wedge-shaped in longitudinal vertical section, in much the same manner as disclosed in the first described form of the invention. The upper bridging member 17 may be the same as in the first form although it will be longer and will engage the upper surfaces of both forks 33 and 34 of the locking bar. The lower spring 25' functions the same as in the form first described, but is preferably forked to provide two separate inwardly extending arms 42 and 43 engaging respectively under the forks 33 and 34 of the locking bar. It will be understood that the inner ends of these forks 33 and 34 engage the upper surface 29 of the mating arm B, and in general this form of the invention operates in much the same manner as the first described form and the detailed method of operation need not be repeated.

In connection with either form of the invention, it will be noted that the fulcrum pin 17 can rotate or tilt so as to adjust the inclination of its lower slide surface 21 to the changing inclination of the upper surface of the wedge as it is moved to or from locking position.

We claim:

1. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, and means on the head for guiding the bar in its lengthwise movement, said guide means engaging the upper surface of the wedge near its inner end and the lower surface nearer its outer end so that the inner end of the bar will be swung downwardly as the bar is advanced to locking position.

2. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, means on the head for guiding the bar in its lengthwise movement, said guide means engaging the upper surface of the wedge near its inner end and the lower surface nearer its outer end so that the inner end of the bar will be swung downwardly as the bar is advanced to locking position, the head being recessed beneath the inner portion of the bar, and a spring in this recess normally urging the bar upwardly.

3. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, means on the head for guiding the bar in its lengthwise movement, said guide means engaging the upper surface of the wedge near its inner end and the lower surface nearer its outer end so that the inner end of the bar will be swung downwardly as the bar is advanced to locking position, a spring interposed between the upper guide member and the upper wedge surface of the bar, the head being recessed beneath the inner portion of the bar, and a spring in this recess normally urging the bar upwardly.

4. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, means on the head for guiding the bar in its lengthwise movement, an upper portion of said guide means extending across the upper wedge surface of the bar adjacent its inner end, and a flat leaf spring carried by the upper wedge surface of the bar and upwardly bowed intermediate its ends, said spring being interposed between the bar and upper guide means.

5. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, a leaf spring mounted on the upper wedge surface of the bar, said spring being of substantially the same length as the wedge surface and bowed upwardly intermediate its ends, and means on the head for guiding the bar in its lengthwise movement, said guide means engaging the upper surface of the spring near the inner end of the bar and engaging the lower surface of the bar nearer its outer end so that the inner end of the bar will be swung downwardly as the bar is advanced to locking position, the head being recessed beneath the inner portion of the bar, and a spring in this recess normally urging the bar upwardly.

6. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, the head being provided with substantially parallel upwardly projecting flanges between which the bar is guided in its lengthwise movement, a fulcrum pin mounted in said flanges and extending across the upper surface of the wedge adjacent its inner end, the head providing a fulcrum surface for the lower surface of the wedge nearer its outer end so that the inner end of the bar will be swung downwardly as the bar is advanced to locking position, the head being recessed beneath the inner portion of the bar, and a spring in this recess normally urging the bar upwardly against the fulcrum pin.

7. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, the head being provided with substantially parallel upwardly projecting flanges between which the bar is guided in its lengthwise movement, a fulcrum pin mounted in said flanges and extending across the upper surface of the wedge adjacent its inner end, the head providing a fulcrum surface for the lower surface of the wedge nearer its outer end so that the inner end of the bar will be swung downwardly as the bar is advanced to locking position, and upper and lower springs interposed respectively between the bar and fulcrum pin and between the lower surface of the inner end of the bar and the head.

8. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, the head being provided with substantially parallel upwardly projecting flanges between which the bar is guided in its lengthwise movement, a fulcrum pin rotatably mounted in said flanges and extending across the upper surface of the wedge adjacent its inner end, the pin having a flattened lower wedge-engaging surface, the head providing a fulcrum surface for the lower surface of the wedge nearer its outer end so that the inner end of the bar will be swung downwardly as the bar is advanced to locking position, the head being recessed beneath the inner portion of the bar, and a spring in this recess normally urging the bar upwardly against the fulcrum pin.

9. A hose coupler comprising a head and a projecting arm adapted to engage, respectively, the arm and head of a mating coupler, and a locking device mounted on the head and comprising a wedge-shaped locking bar movable lengthwise of itself and transversely of the head to and from a position with the inner end of the bar projected over the arm of the mating coupler, the wedge portion of the bar increasing in vertical thickness from its inner toward its outer end, a leaf spring mounted on the upper wedge surface of the bar, said spring being of substantially the same length as the wedge surface and bowed upwardly intermediate its ends, the head being provided with substantially parallel upwardly projecting flanges between which the bar is guided in its lengthwise movement, a fulcrum pin rotatably mounted in said flanges and extending across the upper surface of the wedge adjacent its inner end, the pin having a flattened lower surface slidably engaging the upper face of the spring, the head providing a fulcrum surface for the lower surface of the wedge nearer its outer end so that the inner end of the bar will be swung downwardly as the bar is advanced to locking position, the head being recessed beneath the inner portion of the bar, and a spring in this recess normally urging the bar upwardly toward the fulcrum pin.

10. A hose-coupler comprising a head and a projecting arm adapted to engage, respectively, the arm and head of a mating coupler, and a locking device mounted on the head and comprising a vertically split locking bar movable lengthwise of itself and transversely of the head to and from a locking position with the forked inner end of the bar projecting over the arm of the mating coupler, the bar being wedge-shaped in longitudinal vertical section with the wedge portion increasing in vertical thickness from its inner end toward its outer end, guide members on the head and engaging the outer sides of the bar and also between the forks of the split inner portion of the bar so as to spread the forks as the bar is advanced to its locking position, a fulcrum member carried by the guide members and slidably engaged by the upper wedge surface of the bar adjacent its inner end, the head providing a fulcrum surface for the lower surface of the wedge nearer its outer end so that the inner forked end of the bar will be swung downwardly as the bar is advanced to locking position, the head being recessed beneath the inner portion of the bar, and a spring in this recess normally urging the bar upwardly toward the upper fulcrum member.

11. A hose-coupler comprising a head and a projecting arm adapted to engage, respectively, the arm and head of a mating coupler, and a locking device mounted on the head and comprising a vertically split locking bar movable lengthwise of itself and transversely of the head to and from a locking position with the forked inner end of the bar projecting over the arm of the mating coupler, the bar being wedge-shaped in longitudinal vertical section with the wedge portion increasing in vertical thickness from its inner end toward its outer end, guide members on the head and engaging the outer sides of the bar and also between the forks of the split inner portion of the bar so as to spread the forks as the bar is advanced to locking position, a fulcrum pin rotatably mounted in the guide members and extending across the forked upper surface of the wedge adjacent its inner end, the pin having a flattened lower wedge-engaging surface, the head providing a fulcrum surface for the lower surface of the wedge nearer its outer end so that the forked inner end of the bar will be swung downwardly as the bar is advanced to locking position, the head being recessed beneath the inner portion of the bar, and a spring in this recess normally urging the bar upwardly toward the fulcrum pin.

EDWARD A. RUSSELL.
WALTER W. WILSON.